May 8, 1945.  W. LEATHERS  2,375,373
STRAIN-RELIEF FOR ELECTRIC CORDS
Filed Aug. 27, 1943
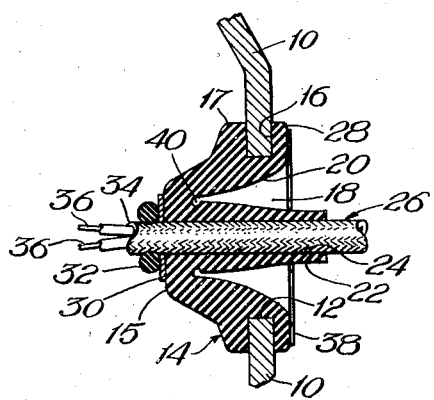
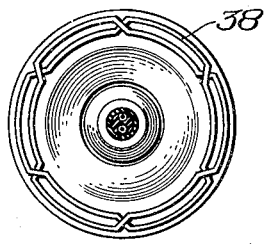
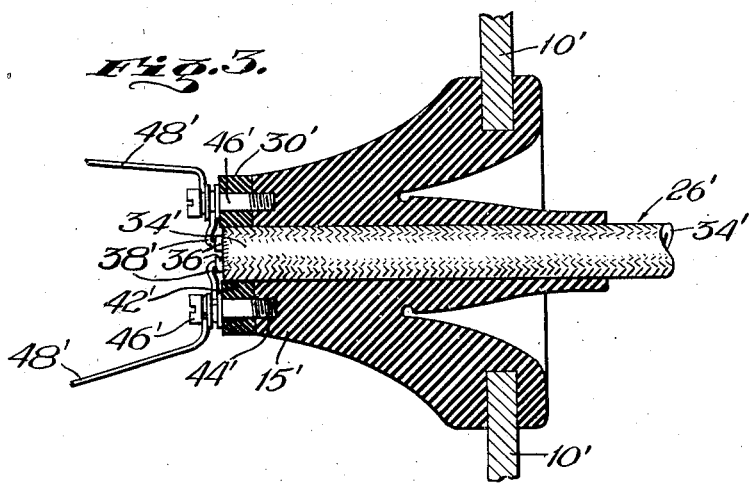
INVENTOR
Ward Leathers Patented May 8, 1945

2,375,373

UNITED STATES PATENT OFFICE 2,375,373

STRAIN RELIEF FOR ELECTRIC CORDS

Ward Leathers, Brooklyn, N. Y., assignor to Quadrex Corporation, New York, N. Y., a corporation of Delaware Application August 27, 1943, Serial No. 500,202

4 Claims. (Cl. 173—322)

This application is a continuation-in-part of my copending application, Serial No. 423,841, filed December 18, 1941, issued as Patent No. 2,333,018 on October 26, 1943, for Vertical-axis canister-type vacuum cleaner.

The present invention relates to electrical lead-in connections for appliances, and more particularly to a resilient strain-relief connection for electrical appliances whereby electric current issuing from a conventional wall outlet, or other source of power, may be conducted through the casing of an electrical appliance and connected to suitable terminals within the casing for application to the motor, resistance unit or other electrical load, whatever it may be, associated with the appliance.

Heretofore, various means have been employed for leading electric current to a point within the casing of an electrical appliance from an outside source of power. The simplest of these consists in the provision of an opening of substantially the same size and cross-sectional shape as the lead-in wire and through which the lead-in wire extends. Another type of lead-in connection consists in the provision of a cylindrical opening in the casing or wall of the appliance around the edges of which there is disposed a rubber ring-like grommet or other strain-relief member and through which member the lead-in wire extends. Still other types of lead-in connections consist in the provision of some sort of reenforcement on the lead-in wire adjacent the opening in the casing through which the lead-in wire extends. Such reenforcement for the lead-in wire in certain instances consists of a mass of resilient reenforcing material cemented, vulcanized or otherwise secured to the lead-in wire at its point of entry into the casing and also throughout a short distance beyond the outer surface of the casing. In other instances, the reenforcement consists of a spring which is suitably anchored to the casing adjacent the lead-in point and which extends outwardly and surrounds the lead-in wire and is so biased as to tend to retain the portion of the lead-in wire adjacent the opening in the casing perpendicular to the casing.

Obviously, in the first example above cited, no strain-relief protection whatsoever is afforded for the lead-in cable and repeated lateral application of thrust to the cable at the point where the lead-in connection occurs will readily cause rupture of the cable at this point by virtue of the abrasive action of the inner edges of the opening against the outer surface of the cable. Where a rubber or other resilient grommet is employed in an effort to give some measure of strain-relief, complete protection to the cable is not afforded by virtue of the fact that the grommet does not prevent sharp bending of the cable beyond its elastic limit. In instances where the cable is reenforced at or near its point of entrance into the casing, the measure of strain-relief afforded is somewhat better than in the former two instances cited. However, upon repeatedly subjecting the cable to lateral stresses, particularly if the resilient reenforcing material has become brittle with age, cracking of the material at its point of juncture with the casing is likely to occur with consequent rupture of the insulation of the cable proper. Additionally, such reenforcing means ordinarily projects outwardly beyond the plane of the outer surface of the casing and, besides presenting an unsightly appearance, also constitutes an undesirable obstruction and frequently precludes the placing of the appliance at close proximity to a wall or other object. In the case where a straightening means for the cable, such as a spring, is employed, considerable difficulty is encountered in permanently anchoring the spring to the casing in order that it may at all times perform its intended function and also danger is involved in that the material of the spring often causes abrasion of the lead-in wire and a consequent shorting of the copper lead-in strands. Furthermore, the use of a spring which extends outwardly from the casing a considerable distance is inconvenient, in that it is both unsightly and unwieldy and constitutes an obstruction.

The present invention is designed to overcome the above outlined limitations that are attendant upon the use of present-day lead-in connections and, toward this end, contemplates the provision of a unitary, one-piece, moulded plug through which the lead-in cable extends and to which it may permanently be united by a suitable adhesive or by a vulcanizing operation. The plug is formed of resilient material and has associated therewith means whereby it may be caused to firmly engage the inner edges of the opening in the casing of the appliance to which it is applied. The strain-relief features of the lead-in connection are obtained by virtue of the provision of an anchoring point for the cable which is located well within the casing to which the plug is applied and also by virtue of a reenforcement for the cable in the vicinity of its point of entry into the casing. The plug is formed with a relatively deep socket, from the bottom of which the reenforcement extends outwardly in such a manner that the cable which passes through the reenforcement is not subject to sharp bending or torsional stresses, even though the appliance to which the connection is applied be of relatively heavy construction and the cable be pulled laterally of the appliance.

The provision of an electrical strain-relief connection of the character set forth above being the principal object of the invention, it is another object of the invention to provide such a connection which may be manufactured at a relatively low cost by a simple moulding operation.

Another object of the invention is to provide a strain-relief connection of the type set forth above which is extremely rugged and durable and which will, within limits, accommodate lead-in openings of varying sizes.

A further object of the invention is to provide a strain-relief lead-in connection which affords protection for the lead-in cable not only against lateral stresses but against longitudinal stresses.

Another object of the invention is to provide a strain-relief connection which does not project materially beyond the outer surface of the casing and which, consequently, presents no obstruction and permits placing of the casing in close proximity to a wall or the like.

Yet another object of the invention is to provide a lead-in connection for electric lead-in cables which may, if desired, be manufactured independently of the cable and to which various lead-in cables may be applied prior to application of the connection to the casing of an electrical appliance.

Other objects and advantages of the invention not at this time enumerated will become more readily apparent hereinafter.

In the accompanying single sheet of drawings, two embodiments of the invention are shown. In the drawing:

Fig. 1 is a longitudinal sectional view taken centrally through one form of the improved strain-relief lead-in connection and showing the same applied to the wall of an electrical appliance.

Fig. 2 is a front view of a novel strain relief for the electric supply cord.

Fig. 3 is a sectional view, similar to Fig. 1, showing a modified form of the improved lead-in connection.

In all of the above described views like characters of reference are employed to designate like parts throughout.

Referring now to the drawing in detail, and particularly to Figs. 1 and 2, the reference character 10 designates a wall or casing associated with any suitable electrical appliance (not shown) which may, for example, be a vacuum-cleaner, a washing machine, an electric heater, or, in fact, any electrical appliance whatsoever.

The casing 10 is provided with a lead-in opening 12 which is preferably of circular configuration and in which opening the improved strain-relief lead-in connection comprising the present invention is installed.

The strain-relief connection involves in its general organization a one-piece resilient moulded body portion 14 which is preferably formed of soft rubber, latex, or of a suitable resilient plastic insulating material. The member 14 is generally of conical design and is provided with a tapering conical wall 17. An annular groove 16 is formed adjacent the outer extremity of the wall 17 and is designed for reception therein of the circular edge of the lead-in opening 12 in order that the member 14 may be anchored and thus retained within this opening.

The inner end of the tapering wall 17 merges into and terminates in a substantially flat base portion 15. The member 14 is provided with a tapering socket 18 having generally curved walls 20 and extending outwardly from the bottom of the socket 18 is a generally cylindrical or tubular reenforcing wall or sleeve 22 having a central bore 24 through which an electrical cable 26, designed for connection to a conventional electrical wall outlet (not shown) is adapted to extend for application of electrical current to the motor, resistance unit or other load of the appliance. The reenforcing wall 22 projects outwardly of the socket 18 and terminates substantially flush with or slightly beyond the outer surface of the body portion 14 and the cable 26 which passes therethrough may, if desired, be cemented, vulcanized or otherwise permanently secured to the inner wall of the bore 24. However, where the connection is to be manufactured as an auxiliary lead-in connection for existing appliances and to permit replacement of the electrical lead-in cable 26, it is sufficient that the bore 24 be substantially of the same diameter as the cable and be designed for frictional reception of the cable therethrough. A flat washer 30 surrounds the cable 26 and bears against the inner face of the body portion 14 and is held in position thereagainst by a suitable clamping collar 32 of conventional design which grips the cable 26 and prevents longitudinal shifting thereof and consequent strain on the interior binding posts or other anchor points (not shown) within the casing 10 of the appliance.

The cable 26, since it supplies current to the load of the appliance, obviously must be of the dual wire type and, toward this end, consists of an outer sheath or casing 34 of insulating material, such as rubber, fabric or the like, through which there extends the usual insulated lead-in wires 36 which are conducted to the terminal or binding posts (not shown) of the appliance within the casing 10.

In order to provide an attractive and ornamental device, a front face 28 of the lead-in connection which is of ring-like shape may, in the moulding process thereof, have applied thereto a suitable ornamental design 38 as shown in Fig. 2.

The central tubular reenforcing wall or sleeve 22, previously referred to, possesses a slight taper and the wall thereof is slightly thinner adjacent its outer extremity than adjacent its point of juncture with the base 15 of the body portion 14. An annular recess 40 is provided adjacent the point of juncture of the sleeve 22 with the base portion 15 to permit limited lateral flexing of the reenforcing sleeve 22 at this point. The substantially conical wall 17 of the body portion 14 also diverges outwardly from the base 15 and is substantially thicker adjacent its outer extremities than it is adjacent its point of juncture with the base 15, thus affording ample material adjacent its outer extremity for formation of the retaining groove 16 and also permitting limited rocking or tilting movement of the base 15 out of its normal plane under conditions of strain when lateral stress is applied to the cable 26.

By virtue of the specific shape of the body portion 14 of the improved strain-relief connection, as described above, it will be seen that when lateral stress is applied to the cable 26 tending to bend the same in one direction or another normal to the plane of the opening 12, extreme bending of the cable 26 is prevented and the limit of maximum bending is attained when the outer surface of the wall of the reenforcing portion 22 engages the inner rounded surface of the socket portion 18. Thus, even under maximum conditions of lateral stress, the cable 26 will maintain a very substantial minimum radius of curvature at its point of entry into the casing 10. By virtue of the fact that the body portion 14 of the connection is formed of resilient material and is provided with relatively thin walls adjacent its base 15, the same will yield when longitudinal pulling forces are exerted on the cable 26 and thus tend to minimize any danger of pulling of the cable 26 from the bore 24 through which it extends. In addition to this, upon such yielding of the body portion 14 under conditions of longitudinal pulling stress, the material of the base portion 15 will bind against the outer surface of the cable 26 and further reduce any tendency for the cable to be pulled from the bore 24.

In the modification shown in Fig. 3, the shape of the resilient body portion 14' of the strain-relief connection remains substantially the same as in the form of the invention shown in Figs. 1 and 2. In this instance, however, the washer 30 and clamping collar 32 have been omitted and in their stead there has been substituted a plate 30' of insulating material which may be of hard rubber and which is preferably vulcanized to the base portion 15'. The plate 30' conforms in configuration to the shape of the inner surface of the base portion 15' and the cable 26' passes through a central opening 42' formed in this plate. On opposite sides of the opening 42' are formed a pair of threaded openings 44' designed for reception therein of a pair of clamping studs 46'. The insulation 34' of the cable 26' is removed adjacent its inner extremity, thus exposing the inner insulated lead-in wires 36' which may be bared at their ends as at 38' and these ends wrapped around the clamping studs 46' and the studs firmly screwed into their respective openings 44' for anchoring the inner end of the cable 26' to the strain-relief connection. It will be understood, of course, that the clamping studs 46' also serve as terminals for a pair of connecting wires 48' leading to the terminals or binding posts of the load associated with the electrical appliance within the casing 10'. The operation and function of the form of the invention just described and shown in Fig. 3 is substantially the same as the operation and function of the form of the invention shown in Figs. 1 and 2, the only difference being that in the latter instance the electrical strain-relief connection is supplied with self-contained terminals for the lead-in cable 26.

The invention is not to be limited to the exact arrangement of parts shown in the accompanying drawing or described in this specification as various changes in the details of construction may be resorted to without departing from the spirit of the invention. Only insofar as the invention has been particularly pointed out in the accompanying claims is the same to be limited.

What is claimed is:

1. A one-piece electrical strain-relief lead-in connection designed for insertion in a lead-in opening provided in the casing of an electrical appliance comprising a cup-shaped member formed of resilient material and including a base portion, a substantially conical wall projecting outwardly from the peripheral regions of said base portion and terminating in a circular rim portion, means for securing said circular rim portion to the inner edges of said opening, a tubular reinforcing wall projecting outwardly from said base portion, the external diameter of said reinforcing wall at any point along its length being less than the minimum internal diameter of said conical wall, said reinforcing wall being centered within the confines of said conical wall, there being a central bore extending completely through said reinforcing wall and base portion, and a flexible lead-in cable extending through said central bore, said lead-in cable completely filling said central bore and being frictionally engaged coextensively throughout the entire extent of the latter, said base portion, a major portion of said tubular reinforcing wall and substantially all of said conical wall being adapted to occupy a position within the confines of the casing to which the strain-relief lead-in connection is applied.

2. A one-piece electrical strain-relief lead-in connection designed for insertion in a lead-in opening provided in the casing of an electrical appliance comprising a cup-shaped member formed of resilient material and including a base portion, a substantially conical wall projecting outwardly from the peripheral regions of said base portion and terminating in a circular rim portion, the material of said wall being tapered outwardly in cross-section and affording a rim portion of greater thickness than the thickness of the wall adjacent its juncture with said base portion, means for securing said circular rim portion to the inner edges of said opening, said base portion being provided with a central opening therethrough, a tubular reinforcing wall projecting outwardly from said base portion, the maximum external diameter of said reinforcing wall being less than the minimum internal diameter of said conical wall, said reinforcing wall being contained substantially wholly within the confines of said conical wall, there being a central bore extending completely through said tubular reinforcing wall and base portion, a flexible lead-in cable extending through said bore and frictionally engaging the walls thereof coextensively, said reinforcing wall tapering in thickness outwardly, said base portion, a major portion of said tubular reinforcing wall and substantially all of said conical wall being adapted to occupy a position within the confines of the casing to which the strain-relief lead-in connection is applied.

3. A one-piece electrical strain-relief lead-in connection designed for insertion in a lead-in opening provided in the casing of an electrical appliance comprising a cup-shaped member formed of resilient material and including a base portion, a substantially conical wall projecting outwardly from the peripheral regions of said base portion and terminating in a circular rim portion, means for securing said circular rim portion to the inner edges of said opening, said base portion being provided with a central opening therethrough, a flexible lead-in cable extending through and secured in said opening, and a tubular reinforcing wall projecting outwardly from said base portion and surrounding said cable and frictionally engaging the latter throughout substantially its entire length, there being an annular groove formed in said reinforcing wall exteriorly thereof adjacent its point of juncture with said base portion to permit ready flexing of the reinforcing wall within the confines of said conical wall, said base portion, a major portion of said tubular reinforcing wall and substantially all of said conical wall being adapted to occupy a position within the confines of the casing to which the strain-relief lead-in connection is applied.

4. An electrical strain-relief lead-in connection designed for insertion in a lead-in opening provided in the casing of an electrical appliance comprising a cup-shaped member formed of resilient material and including a base portion, a substantially conical wall projecting outwardly from the peripheral regions of said base portion and terminating in a circular rim portion, means for securing said circular rim portion to the inner edges of said opening, said base portion being provided with a central opening therethrough, a flexible lead-in cable extending through and secured in said opening, and a tubular reinforcing wall projecting outwardly from said base portion and surrounding said cable, said reinforcing wall tapering outwardly in thickness and terminating substantially flush with said rim, there being an annular groove formed exteriorly of said reinforcing wall adjacent its point of juncture with said base portion to permit ready flexing of the reinforcing wall within the confines of said conical wall, said base portion, a major portion of said tubular reinforcing wall and substantially all of said conical wall being adapted to occupy a position within the confines of the casing to which the strain-relief lead-in connection is applied.

WARD LEATHERS.